(12) United States Patent
Nakamura

(10) Patent No.: US 7,575,032 B2
(45) Date of Patent: Aug. 18, 2009

(54) PNEUMATIC TIRE

(75) Inventor: Shinsuke Nakamura, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 169 days.

(21) Appl. No.: 10/571,473

(22) PCT Filed: Sep. 6, 2004

(86) PCT No.: PCT/JP2004/012941

§ 371 (c)(1),
(2), (4) Date: Mar. 13, 2006

(87) PCT Pub. No.: WO2005/025897

PCT Pub. Date: Mar. 24, 2005

(65) Prior Publication Data

US 2006/0272761 A1    Dec. 7, 2006

(30) Foreign Application Priority Data

Sep. 12, 2003   (JP) .............................. 2003-321205

(51) Int. Cl.
 *B60C 15/00*   (2006.01)
 *B60C 15/02*   (2006.01)
 *B60C 15/024*  (2006.01)
 *B60C 15/04*   (2006.01)

(52) U.S. Cl. ........................ 152/539; 152/540; 152/544

(58) Field of Classification Search ................ 152/539, 152/540, 544

See application file for complete search history.

(56) References Cited

U.S. PATENT DOCUMENTS

| | | | |
|---|---|---|---|
| 5,968,296 A | 10/1999 | Ahouanto | |
| 6,691,756 B2 * | 2/2004 | Koya et al. | 152/540 |
| 6,877,538 B2 * | 4/2005 | Scheuren | 152/544 |
| 7,172,002 B2 * | 2/2007 | Ueyoko et al. | 152/510 |

FOREIGN PATENT DOCUMENTS

| | | | |
|---|---|---|---|
| EP | 0881104 A1 | | 12/1998 |
| JP | 2-200504 A | | 8/1990 |
| JP | 6-206408 A | | 7/1994 |
| JP | 9-58227 | * | 3/1997 |
| JP | 09123714 | * | 5/1997 |
| JP | 11-208224 A | | 8/1999 |

(Continued)

*Primary Examiner*—Justin Fischer
(74) *Attorney, Agent, or Firm*—Sughrue Mion, PLLC

(57) ABSTRACT

A pneumatic tire whose rim slip resistance and durability are improved by optimizing the shape of the bead base is provided.

A polygonal bead core 3 having a bottom 2 extending generally along the tire width direction is embedded in a bead portion 1. The bead portion 1 has a bead base 6 extending between a bead heel 4 and a bead toe 5. A maximum displacement point 11 is within a range of 25% or less of the width w of the bottom of the bead core with the third base point 10. The interference $t_a$ at the maximum displacement point 11 is 1.1 to 1.3 times as much as the interference $t_b$ at the second base point 8. the bead base 6 extends at least between the bead heel 4 and the first base point 8 and has a first tapered portion 12 with a taper angle $\theta_1$ being identical with or greater by three degrees or less than a taper angle $\theta_{BS}$ of a bead seat of the standard rim R.

12 Claims, 5 Drawing Sheets

FOREIGN PATENT DOCUMENTS

| JP | 2000-62418 A | 2/2000 |
| JP | 2001-150913 A | 6/2001 |
| JP | 2001206027 * | 7/2001 |
| JP | 2001213125 A | 8/2001 |
| JP | 2002254908 * | 9/2002 |

* cited by examiner

PNEUMATIC TIRE

TECHNICAL FIELD

The present invention relates to a pneumatic tire and especially to a heavy-duty tire in which a polygonal bead core having a bottom extending generally along the tire width direction is embedded in a bead portion, the bead portion having a bead base extending between a bead heel and a bead toe. The present invention is aimed at improvements in rim slip resistance and durability.

RELATED ART

A pneumatic tire used as a heavy-duty tire for a truck, bus or the like is mounted on a rim having a bead seat with a certain taper angle, so that the tire has a configuration in which a bead core having a polygonal sectional shape is so embedded in a bead portion that its bottom becomes generally parallel to the bead seat of the rim and in which the bead base is provided with a taper angle generally identical with the bead seat. However, a force which makes the bead core rotating about the bead core acts on the pneumatic tire having such a bead configuration due to the friction force between the bead portion and the rim, and thus the bead toe is prone to be in a condition of being lifted up from the rim to decrease a contact pressure against the rim. As a result, there has been a problem of inducing a displacement between the tire and rim (rim slip) by the time of steering, breaking or running over convex/concave of the road surface.

In order to prevent such a rim slip, the bead portion is commonly shaped to have a larger interference which is defined as the amount of compression of the tire bead base in a radial direction of the tire when mounted on a rim. With such a shape, the rubber element of the bead portion is compressed and elastically deformed to increase the contact pressure between the tire and rim when the tire is mounted on the rim. The rubber element is, however, deformed toward the radially outward direction since the bead heel is restricted its deformation in the width direction by the rim flange, whereas the metal element such as a wire chafer and a carcass is hardly deformed in both width and radial directions since it is secured by the bead core. Thus, when the interference of the overall bead base is uniformly increased, a larger shearing strain occurs between the rubber and metal elements to incur a problem that separations are easily caused in the bead heel.

In order to prevent the separation in the bead heel, the above-mentioned shearing strain has to be reduced. Thus, the conventional technique reduces the shearing strain between the rubber and metal elements to inhibit the separation in the bead heel by enlarging the radius of curvature of the bead heel and thus reducing the amount of rubber located in the neighbor of the bead heel as well as by decreasing the contact pressure between the widthwise outer portion of the bead base and the rim seat, as shown in FIG. 5. Although such a tire may suppress the separation in the bead heel at the early stage of use, a relatively large space S exists between the bead portion and the rim flange, so that the rubber element of the bead portion is deteriorated and causes a deformation in filling the space S, which deformation is so-called settling, when the tire has been used for a long time. As a result, the shearing strain between the rubber and metal elements increases in the widthwise outer direction, which also incurs a problem that separations are easily caused.

In order to solve these problems, Japanese Patent Laid-Open No. 2001-239812, for example, discloses a pneumatic tire in which the base line is flexed to make the taper angle at the bead toe side larger than the taper angle at the bead heel side, as well as a concave portion is formed on the bead toe portion at the inner side along the bead portion. Japanese Patent Laid-Open No. 2001-150913 discloses a pneumatic tire in which the amount of compression is 1-5 mm at the point immediately below the center of the bead core and the maxim value of the amount of compression at the bead toe side in relation to the point immediately below of the center of the bead core is 1.15-1.65 times as much as the amount of compression at the point immediately below the center of the bead core. The shape of the bead heel side of this tire is, however, not optimized for effectively preventing the separation in the bead heel.

Japanese Patent Laid-Open No. 2001-213125 discloses a pneumatic tire in which the volume of the rubber chafer which is located at the bead heel side in relation to a radial line passing through the sectional center of the bead core in the state where the tire is mounted on the rim and which is pushed away and deformed by the bead seat of the rim is 0.3-0.8 times as much as the volume of the space which is located at the corner where the bead seat of the rim continues to the rim flange and receives the rubber chafer pushed away and deformed by the rim mounting, thereby reducing the sharing deformation at the area corresponding to the bead heel and preventing the separation of the rubber chafer. The shape of the bead toe side of this tire is, however, not optimized for effectively preventing the rim slip.

DISCLOSURE OF THE INVENTION

Accordingly, the object of the present invention is to provide a pneumatic tire in which both of the rim slip resistance and the durability are improved by optimizing the shape of the bead base.

In order to achieve the above-mentioned object, the present invention is a pneumatic tire in which a polygonal bead core having a bottom extending generally along the tire width direction is embedded in a bead portion, the bead portion having a bead base extending between a bead heel and a bead toe, characterized in that, in the widthwise section of the tire, when first, second and third base points are defined as intersections of lines extending radially inward from an outer end point, a widthwise center point and a inner end point, respectively, and the bead base, and a maximum displacement point is defined as a point where an interference is maximum, the maximum displacement point is within a range of 25% or less of the width of the bottom of the bead core with the third base point as the center of the range, the interference at the maximum displacement point is 1.1-1.3 times as much as the interference at the second base point, the bead base extends at least between the bead heel and the first base point and has a first tapered portion with a taper angle being identical with or greater by three degrees or less than a taper angle of a bead seat of a standard rim.

As used herein, the term "generally along the tire width direction" refer to a direction that extends within a range of 0-20 degrees, and preferably 0-10 degrees in relative to the tire width direction. The term "interference" refers to the amount of compression of the tire bead base in a radial direction of the tire when mounted on a rim. The terms "standard rim" refers to a standard rim (or a approved rim or a recommended rim) specified in an industrial specification, standard or the like such as JATMA, TRA and ETRTO which are effective in the region where the tire is manufactured, sold or used.

The bead base preferably has a second tapered portion extending widthwise outwardly from the maximum displacement point and having a taper angle larger than the taper angle of the bead seat of the standard rim by 10-14 degrees, and a third tapered portion extending widthwise inwardly from the maximum displacement point and having a taper angle identical to or smaller by five degrees or less than the taper angle of the bead seat of the standard rim.

The second tapered portion preferably continues to widthwise inside of the first tapered portion. In this case, it is more preferred that the first and second tapered portions contact with each other at the second base point.

The maximum displacement point is preferably located widthwise outside of the third base point.

The interference at the first base point is preferably 0.7-1.0 times as much as the interference at the second base point.

It is preferable that the contact pressure between the bead portion and the rim at the first base point is 0.6-0.8 times as much as that at the second base point and the contact pressure between the bead portion and the rim at the third base point is 0.8-1.0 times as much as that at the second base point in the state where the tire is mounted on the standard rim.

The area defined by a line extending widthwise outwardly from the outer end point of the bottom of the bead core, a line extending radially inwardly from the outer end point of the bottom of the bead core, and the outer profile line of the tire is preferably 0.93-0.97 times as much as the area defined by the above-mentioned two lines and the outer profile line of the rim.

BEST MODE FOR CARRYING OUT THE INVENTION

Figure 1:
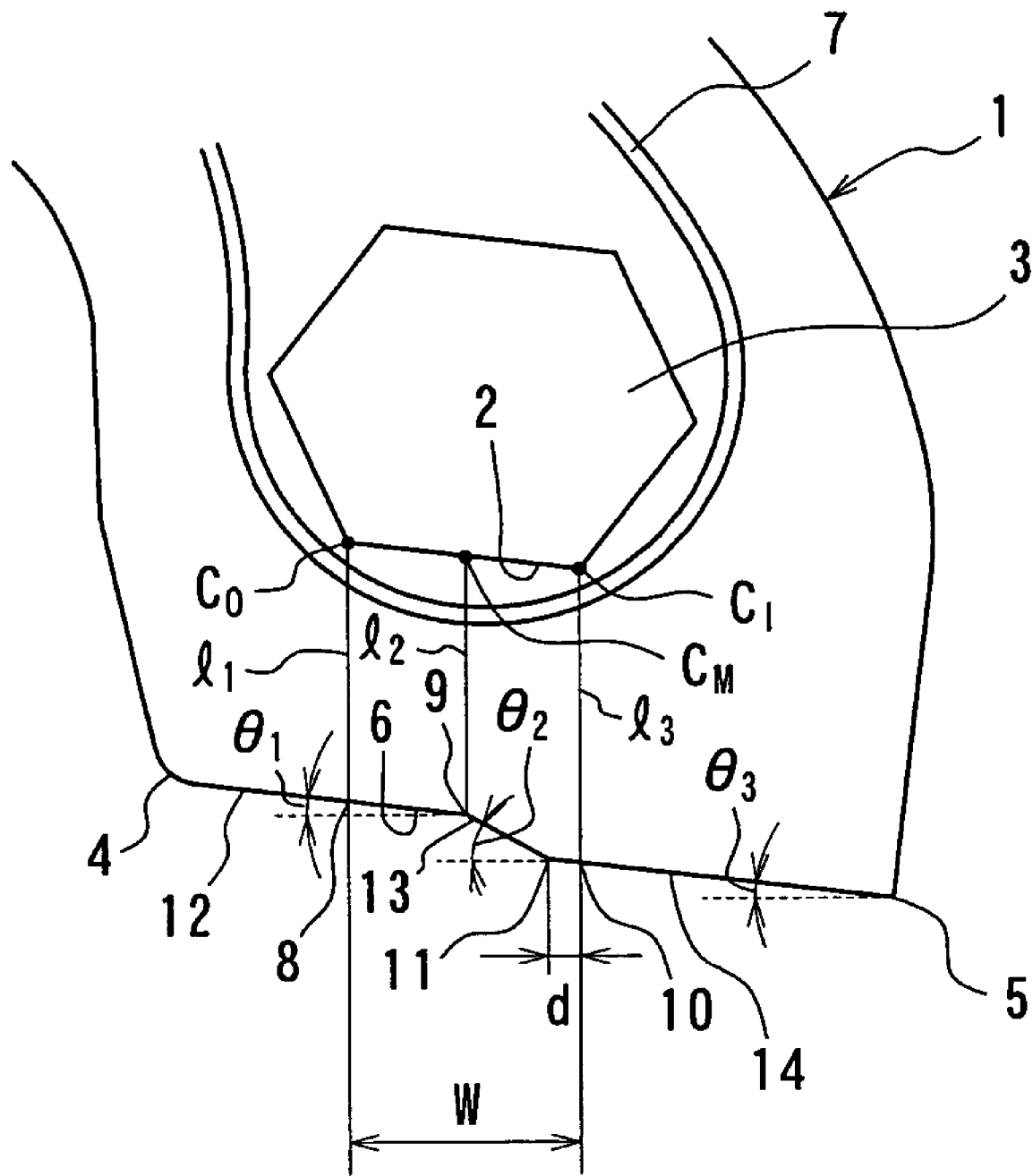
FIG. 1 is a widthwise sectional view of a bead portion of a representative pneumatic tire according to the present invention.
Figure 2:
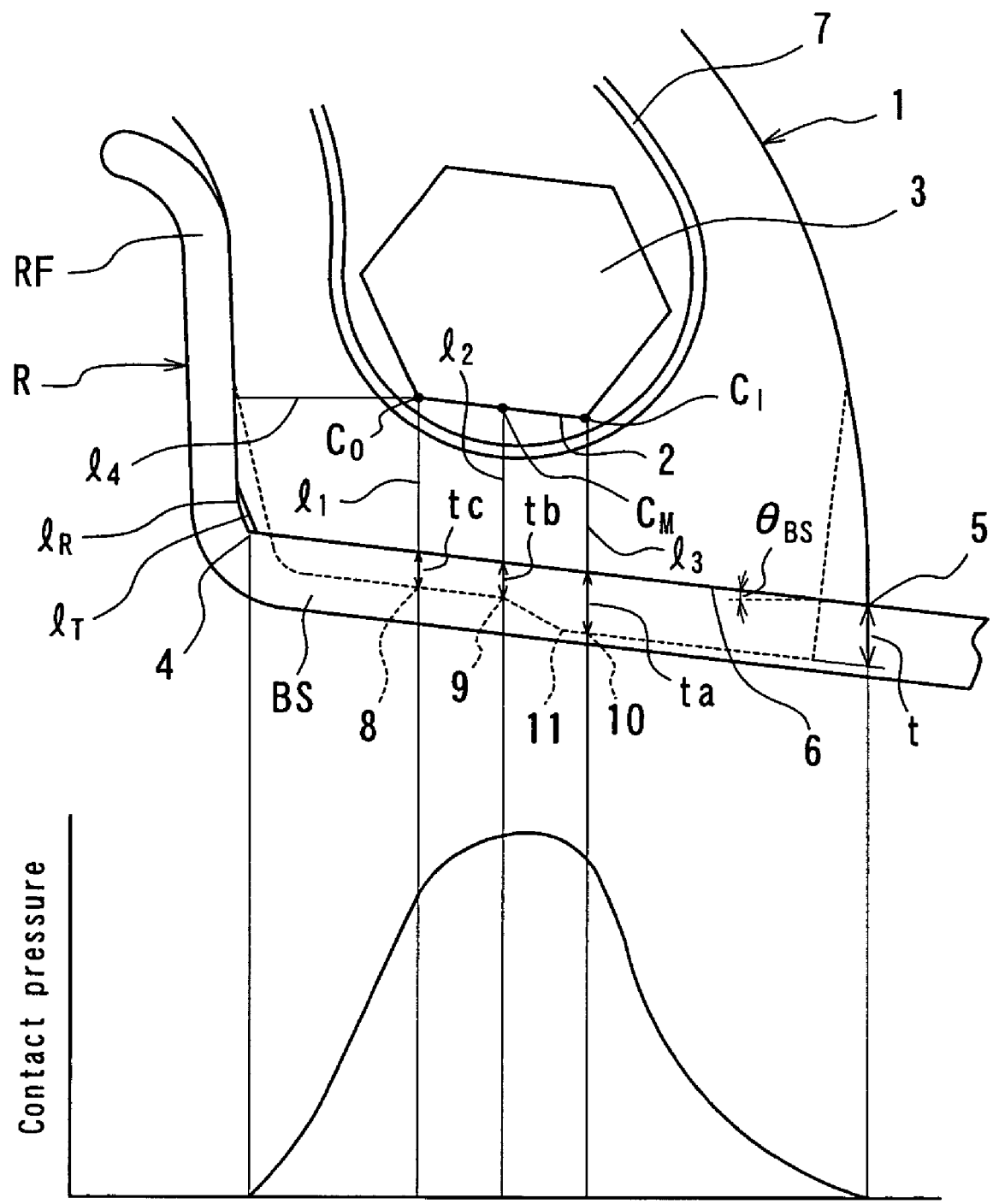
FIG. 2 is a widthwise sectional view of the bead portion of the tire of FIG. 1 showing in the state that the tire is mounted on a standard rim R.

In the next, explanation will be made on an embodiment of the present invention with reference to the accompanying drawings. FIG. 1 is a widthwise sectional view of a bead portion of a representative pneumatic tire (hereinafter referred to as "tire") according to the present invention, and FIG. 2 is a widthwise sectional view of the bead portion of the tire of in FIG. 1 showing in the state that the tire is mounted on a standard rim R.

In a bead portion 1, embedded is a polygonal bead core 3 having a bottom 2 extending generally along the tire width direction. The bead portion 1 also has a bead base 6 extending between a bead heel 4 and a beat toe 5. A carcass 7 is so disposed that it is turned around the bead core 3. In the bead portion 1, a first base point 8, a second base point 9 and a third base point 10 are defined as intersections of lines $l_1$, $l_2$ and $l_3$, respectively, extending radially inward from an outer end point $C_O$, a widthwise center point $C_M$ and an inner end point $C_I$, respectively, and a maximum displacement point 11 is defined as a point on the bead base 6 where an interference t is maximum.

And the major constitutional feature of the present invention is that the maximum displacement point 11 is located within a range of 25% or less of the width w of the bottom of the bead base with the third bead base point 10 as the center of the range; the interference $t_a$ at the maximum displacement point 11 is 1.1-1.3 times as much as the interference $t_b$ at the second base point 9; and the bead base 6 extends at least between the bead heel 4 and the first base point 8 and has a first tapered portion 12 with a taper angle $\theta_1$ being identical with or greater than a taper angle $\theta_{BS}$ of a bead seat of a standard rim R by three degrees or less.

In the next, it will be discussed, along with its operation, how the present invention has adopted the above-mentioned construction.

Figure 4:
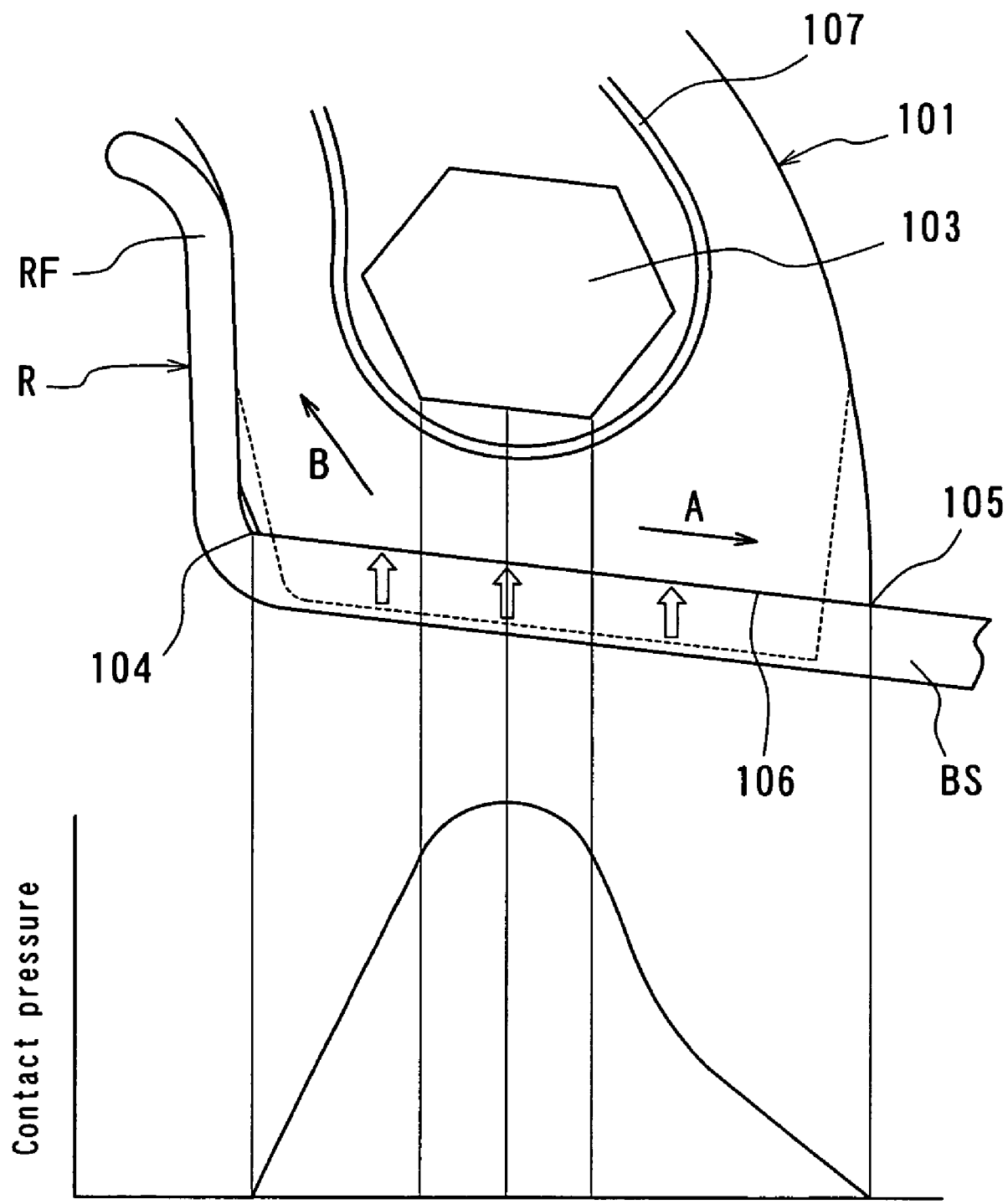
FIG. 4 is a widthwise sectional view of a bead portion of a tire according to the prior art showing in a state that the tire is mounted on a standard rim R.

As described in the above, it is popular for improving the rim slip resistance to form the bead portion in a shape that has a larger interference. FIG. 4 shows the widthwise section of the bead portion 101 in a state where such a tire is mounted on the rim R. The rubber element of the bead portion 101 is pressed by the bead seat BS of the rim R to be compressively deformed. In this regard, the rubber element of the bead portion 101 at the bead toe 105 side is a free end and thus is pushed aside to be largely deformed inwardly in the width direction, as shown by the arrow A. The rubber element located below the bead core 103 is sandwiched by the bead core 103 and bead seat BS to increase the contact pressure. The rubber element at the bead heel 104 side is a fixed end supported by the rim flange RF of the rim R and thus cannot be pushed aside to be deformed in the width direction. Instead, it is largely deformed outwardly in the radial direction, as shown by the arrow B. The distribution of the contact pressure is shown in FIG. 4. As illustrated, the rubber element of the bead portion 101 at the bead heel 104 side is largely deformed outwardly in the radial direction, but the metal element neighboring the rubber element, the carcass 107 in FIG. 4 is secured by the bead core 103 and, in addition, the metal element hardly deforms itself. Therefore, the sharing strain between the rubber element and the metal element increases and a separation is prone to occur between the rubber element and the metal element.

Figure 5:
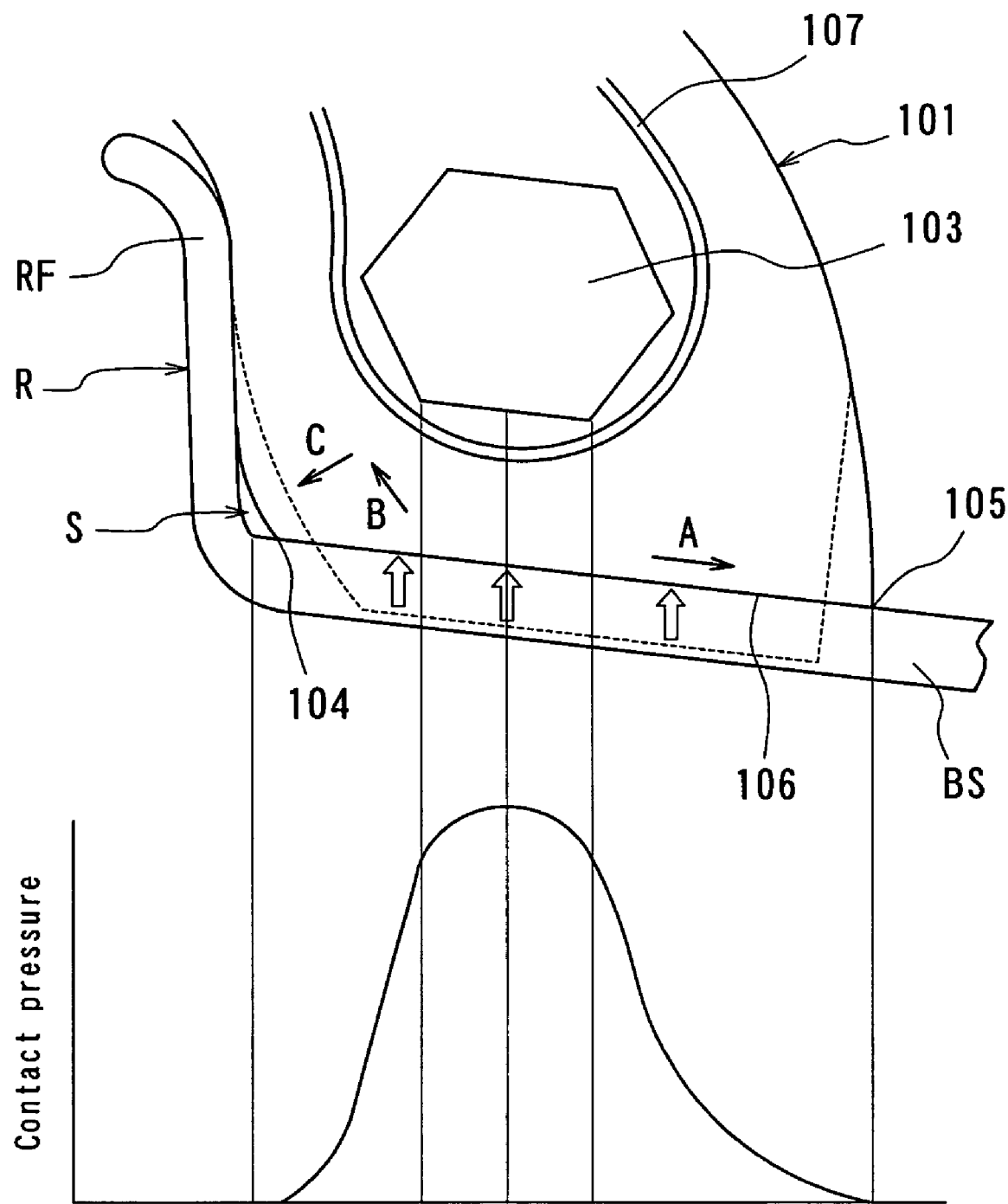
FIG. 5 is a widthwise sectional view of a bead portion of Conventional Example showing in a state that the tire is mounted on a standard rim R.

In order to prevent the occurrence of such a separation, known is a tire in which the amount of the rubber element at the bead heel 104 side is reduced, as shown in FIG. 5. In such a tire, since the space S between the bead portion 101 and the rim flange RF is relatively large, the settling of the rubber element occurs and the rubber element is deformed to fill the space S when the tire has been used for a long time. As a result, the shearing strain between the rubber and metal elements increases, which incur a problem that separations are easily caused.

It is known as the mechanism how the rim slip is caused that a force making the bead core rotating about the bead core is firstly created due to the friction force between the bead portion and the rim, and then the bead toe comes into being lifted up from the rim to reduce a contact pressure against the rim, thereby causing the rim slip. The inventor has further studied the mechanism how the rim slip and the separation is caused, and has found that the contact pressure around the third base point, and more specifically in the area of 25% or less of the width of the bottom of the bead core with the third base point as its center largely contributes to the rim slip while the contact pressure widthwise outside from the first base point largely contributes to the separation. The inventor, then, has reached an idea that the rim slip may be effectively prevented without involving an increase of the sharing strain at the bead heel side by making the interference larger to increase the contact pressure while reducing the amount of the rubber element at the bead heel side without occurring the settling to decrease the contact pressure. However, if the space between the bead portion and the rim flange is large as mentioned above, a separation may occur when the tire has been used for a long time. In view of this, the inventor has conceived that if the bead base 6 is made in such a shape that the maximum displacement point 11 is located in the area of 25% or less of the width of the bottom 2 of the bead core with the third base point 10 as the center of the area and the first tapered portion 12 extending at least between the bead heel 4 and the first base point 8 has the taper angle $\theta_1$ which is generally agreed with the taper angle of the bead seat of the standard rim as with an ordinal tire, the contact pressure around the third base point 10 is increased, but the contact pressure widthwise outside from the first base point 8 is decreased and the space between the bead portion and the rim flange becomes relatively smaller, as shown in FIG. 2, thereby improving both of the rim slip resistance and the durability. The present invention has completed in this way.

In this connection, the interference $t_a$ at the maximum displacement point 11 is configured to be 1.1-1.3 times as much as the interference $t_b$ at the second base point 9. This is because the contact pressure at the maximum displacement point 11 is insufficient and thus the rim slip cannot be effectively prevented when the interference $t_a$ is less than 1.1 times of the interference $t_b$, whereas the mountability onto the rim is likely to be deteriorated when the interference $t_a$ is more than 1.3 times of the interference $t_b$.

Further, the taper angle $\theta_1$ of the first tapered portion 12 is configured to be agreed with or be larger by three degrees or less than the taper angle $\theta_{BS}$ of the bead seat of the standard rim. This is because an air leakage may unfavorably occur when the angle $\theta_1$ is smaller than the taper angle $\theta_{BS}$ of the bead seat of the standard rim, meanwhile the space between the bead portion 1 and the rim flange RF becomes excessively large to cause the settling of the rubber element and thus the separation between the rubber element and the metal element cannot be effectively prevented when the angle $\theta_1$ is larger than the taper angle $\theta_{BS}$ of the bead seat of the standard rim by more than three degrees.

The bead base 6 preferably has a second tapered portion 13 extending widthwise outwardly from the maximum displacement point 11 and having a taper angle $\theta_2$ which is larger than the taper angle $\theta_{BS}$ of the bead seat of the standard rim by 10-14 degrees, and a third tapered portion 14 extending widthwise inwardly from the maximum displacement point 11 and having a taper angle $\theta_3$ which is agreed with or smaller by five degrees or less than the taper angle $\theta_{BS}$ of the bead seat of the standard rim. This is because, on the one hand, the second tapered portion 13 allows the distribution of the contact pressure in the area of 25% or less of the width of the bottom of the bead core with the third base point 10 as the center of the area, which largely contributes to the rim slip, to be relatively flat to further improve the rim slip resistance. On the other hand, this is because the mountability onto the rim is likely to be deteriorated in the case of $\theta_3 > \theta_{BS}$, and an air leakage may be unfavorably caused in the case of $\theta_3 < \theta_{BS} - 5°$.

The second tapered portion 13 preferably continues to widthwise inside of the first tapered portion 12. This is because the contact pressure at widthwise inside of the first tapered portion can be prevented from decreasing by extending the second tapered portion 13 continuously from the first tapered portion 12. In this case, it is more preferred that the first tapered portion 12 and the second tapered portion 13 contact with each other at the second base point 9. This can prevent the contact pressure from locally increasing and thus the contact pressure distribution of the first tapered portion 12 and the second tapered portion 13 becomes relatively flat to further improve the rim slip resistance.

The maximum displacement point 11 is preferably located outside of the third base point 10. By locating the maximum displacement point 11 below the bottom 2 of the bead core, the maximum displacement point 11 is sandwiched by the bottom of the bead core 2 and the rim, so that the contact pressure may be more effectively increased.

Moreover, the interference $t_c$ at the first base point 8 is preferably 0.7-1.0 times as much as the interference $t_b$ at the second base point 9. This is because an air leakage may occur if the interference $t_b$ is less than 0.7 times of the interference $t_b$, while the contact pressure at the bead heel 4 side becomes excessive and the shearing strain between the rubber element and the metal element is increased to cause a separation.

Furthermore, it is preferred that the contact pressure between the bead portion 1 and the rim R at the first base point 8 is 0.6-0.8 times as much as that at the second base point 9 and the contact pressure between the bead portion 1 and the rim R at the third base point 10 is 0.8-1.0 times as much as that at the second base point 9 in the state where the tire is mounted on the standard rim. This is because a relatively flat distribution of the contact pressure which is effective for a suppression of the rim slip cannot be obtained when the contact pressure at the first base point 8 is less than 0.6 times of that at the second base point, while the contact pressure at the bead heel 4 side becomes excessive and the shearing strain between the rubber element and the metal elements is increased to result in a separation when the contact pressure at the first base point 8 is more than 0.8 times of that at the second base point. In addition, the contact pressure at the third base point 10 is insufficient and thus the rim slip cannot be effectively suppressed when the contact pressure at the third base point 10 is less than 0.8 times of that at the second base point 9, while the mountability onto the rim is likely to be deteriorated when the contact pressure at the third base point 10 is more than 1.0 times of that at the second base point 9.

Figure 3:
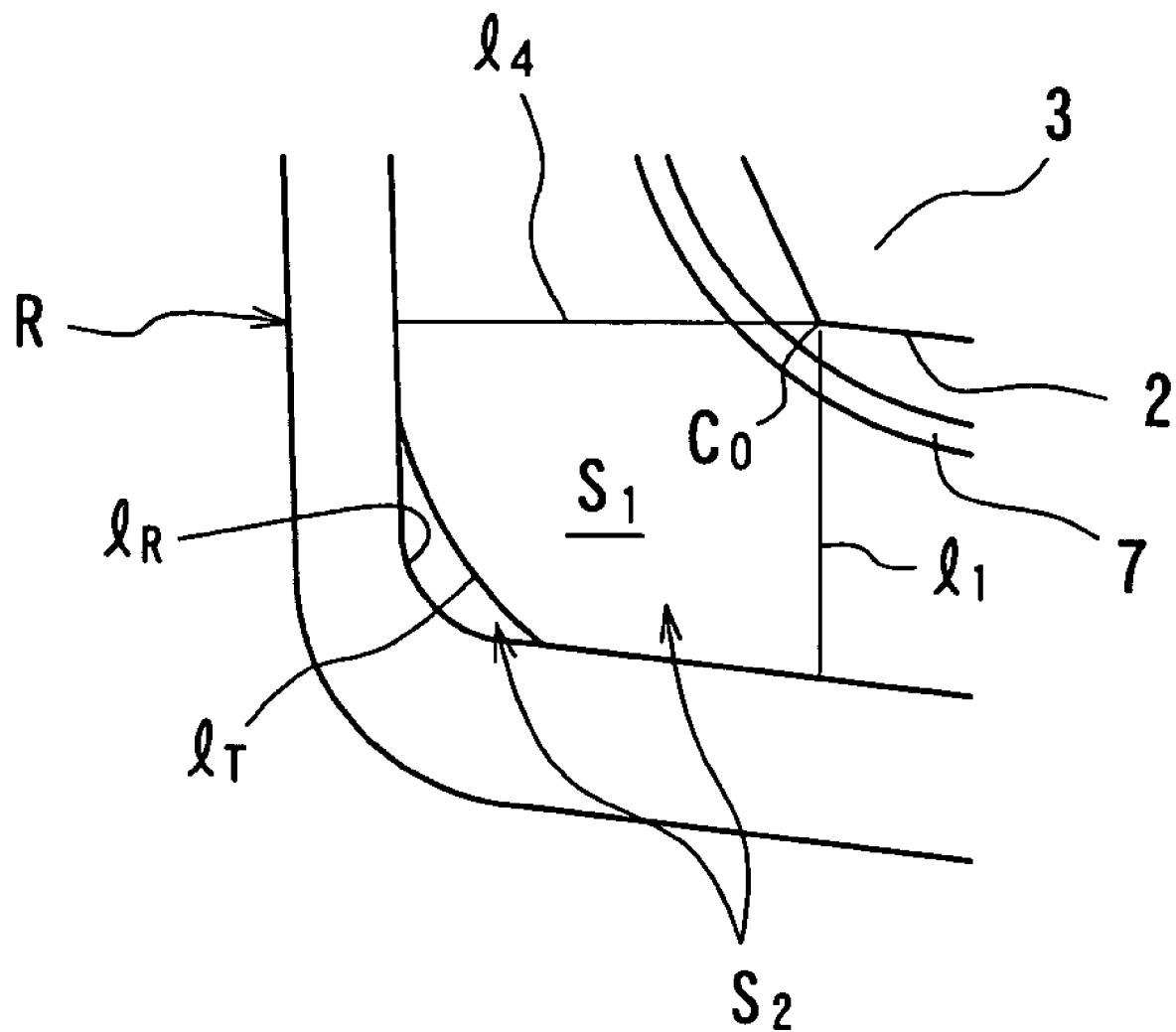
FIG. 3 is an enlarged view of a neighborhood of the bead heel of the bead portion shown in FIG. 2.

FIG. 3 is an enlarged view around the bead heel of the bead portion shown in FIG. 2. The area $S_1$ defined by a line $l_4$ extending widthwise outwardly from the outer end point $C_O$ of the bottom 2 of the bead core, a line $l_1$ extending radially inwardly from the outer end point $C_O$ of the bottom 2 of the bead core, and the outer profile line $l_T$ of the tire is preferably 0.93-0.97 times as much as the area $S_2$ defined by the lines $l_1$ and $l_T$ and the outer profile line $l_R$ of the rim R. This is because a settling of the rubber element may occur and, as a result, the shearing strain between the rubber element and the metal element is increased to easily cause a separation when the ratio $S_1/S_2$ is less than 0.93, while the mountability onto the rim is likely to be deteriorated when the ratio is more than 0.97.

The descriptions above show only a part of the preferred embodiments of the present invention, and various modifications can be made within the scope of the appended claims. For example, the carcass may be covered by a reinforcing layer such as a wire chafer. In FIG. 1, shown is an example in which each of the first, second and third tapered portions has a linear sectional shape and these portions are connected like a broken line. Each of the first, second third tapered portions, however, may have a curved sectional shape and these portions may be connected like a curving line.

EXAMPLES

Next, a tire according to the present invention was experimentally manufactured and its performances were evaluated, which is described below.

A tire of Example is for a heavy load with the tire size of 55/80R63. In this tire, a hexagonal bead core with a bottom of 45 mm is embedded in the bead portion. The maximum displacement point is agreed with the third base point. The first tapered portion with a taper angle of eight degrees extends between the bead heel and the second base point. The second tapered portion with a taper angle of seventeen degrees extends between the second base point and the third base point. The third base point with a taper angle of zero degree extends between the third base point and the bead toe. The tire also has the specifications shown in Table 1.

For comparison, a tire (Conventional Example) having the same tire size and bead core as those of Example, the specifications shown in Table 1 and the bead base shaped as shown in FIG. 5 is also experimentally manufactured.

Each of the above sample tires was mounted on the standard rim specified in TRA (size: 41.00×5.0, taper angle: 5°) to form a tire wheel, and then and internal pressure of 600 kPa (relative pressure) was applied. Each of the following tests was conducted on each of these tires.

1. Rim Slip Resistance

A sheet like pressure sensor was attached between the bead base of the tire of the above-mentioned tire wheel and the bead seat of the rim in the state where no internal pressure was applied and the distribution of the generated contact pressure was measured. The compression force was calculated from the summation of the measured values to evaluate the rim slip resistance. The evaluation results are shown in Table 1.

2. Durability

The above-mentioned tire wheels were made to run on a drum under the condition of the tire load of 920-1500 kN and the running speed of 8 km/h. After running 1,040 km, the length of the separation occurred at the bead heel was measured and the durability was evaluated from the measured value. The evaluation results are shown in Table 1.

The numerical values of the evaluation results in Table 1 are shown by index ratio with the result of Conventional Example 1 as 100. The larger the value is, the more excellent the performance is.

TABLE 1

| | | Conventional Example | Example |
|---|---|---|---|
| First base point | Interference (mm) | 7 | 6.5 |
| | Contact pressure (kN) | 5500 | 5500 |
| Second base point | Interference (mm) | 8.5 | 8.5 |
| | Contact pressure (kN) | 5500 | 6800 |
| Third base point | Interference (mm) | 10 | 12.5 |
| | Contact pressure (kN) | 3800 | 3800 |
| Taper angle of first tapered portion (°) | | 8 | 8 |
| Taper angle of second tapered portion (°) | | — | 17 |
| Taper angle of third tapered portion (°) | | — | 0 |
| Void space ratio | | 0.78 | 0.95 |
| Rim slip resistance | | 100 | 130 |
| Durability | | 100 | 114 |

From the results shown in Table 1, it is appreciated that Example tire has better anti-skid characteristics and durability as compared with Conventional Example tire.

INDUSTRIAL APPLICABILITY

With the present invention, a pneumatic tire having improved rim slip resistance and durability of the tire can be provided by optimizing the shape of the bead base.

The invention claimed is:

1. A pneumatic tire in which a polygonal bead core having a bottom extending generally along the tire width direction is embedded in a bead portion, the bead portion having a bead base extending between a bead heel and a bead toe, characterized in that, in the widthwise section of the tire, when first, second and third base points are defined as intersections of lines extending radially inward from an outer end point, a widthwise center point and a inner end point of the bottom of the bead core, respectively, and the bead base, and a maximum displacement point is defined as a point where an interference is maximum, the maximum displacement point is within a range of 25% or less of the width of the bottom of the bead core with the third base point as the center of the range, the interference at the maximum displacement point is 1.1-1.3 times as much as the interference at the second base point, the bead base extends at least between the bead heel and the first base point and has a first tapered portion with a taper angle being identical with or greater by three degrees or less than a taper angle of a bead seat of a standard rim, wherein the bead base has a second tapered portion extending widthwise outwardly from the maximum displacement point and having a taper angle larger than the taper angle of the bead seat of the standard rim by 10-14 degrees and a third tapered portion extending widthwise inwardly from the maximum displacement point and having a taper angle identical to or smaller by five degrees or less than the taper angle of the bead seat of the standard rim, wherein the first and second tapered portions contact with each other at the second base point.

2. The pneumatic tire according to claim 1, wherein the second tapered portion continues to widthwise inside of the first tapered portion.

3. The pneumatic tire according to claim 1, wherein the maximum displacement point is located widthwise outside of the third base point.

4. The pneumatic tire according to claim 1, wherein the interference at the first base point is 0.7-1.0 times as much as the interference at the second base point.

5. The pneumatic tire according to claim 1, wherein the contact pressure between the bead portion and the rim at the first base point is 0.6-0.8 times as much as that at the second base point and the contact pressure between the bead portion and the rim at the third base point is 0.8-1.0 times as much as that at the second base point in the sat where the tire is mounted on the standard rim.

6. The pneumatic tire according to claim 1, wherein the area defined by a line extending widthwise outwardly from the outer end point of the bottom of the bead core, a line extending radially inwardly from the outer end point of the bottom of the bead core, and the outer profile line of the tire is 0.93-0.97 times as much as the area defined by the above-mentioned two lines and the outer profile line of the rim.

7. A wheel assembly comprising:
a standard rim
a pneumatic tire in which a polygonal bead core having a bottom extending generally along the tire width direction is embedded in a bead portion, the bead portion having a bead base extending between a bead heel and a bead toe, characterized in that, in the widthwise section of the tire, when first, second and third base points are defined as intersections of lines extending radially inward from an outer end point, a widthwise center point and a inner end point of the bottom of the bead core, respectively, and the bead base, and a maximum displacement point is defined as a point where an interference is maximum, the maximum displacement point is within a range of 25% or less of the width of the bottom of the bead core with the third base point as the center of the range, the interference at the maximum displacement point is 1.1-1.3 times as much as the interference at the second base point, the bead base extends at least between the bead heel and the first base point and has a first tapered portion with a taper angle being identical with or greater by three degrees or less than a taper angle of a bead seat of the standard rim, wherein the bead base has a second tapered portion extending widthwise outwardly from the maximum displacement point and having a taper angle larger than the taper angle of the bead seat of the standard rim by 10-14 degrees, and wherein the bead base has a third tapered portion extending widthwise inwardly from the maximum displacement point and having a taper angle identical to or smaller by five degrees or less than the taper angle of the bead seat of the standard rim, wherein the first and second tapered portions contact with each other at the second base point.

8. The wheel assembly according to claim 7, wherein the second tapered portion continues to widthwise inside of the first tapered portion.

9. The wheel assembly according to claim 7, wherein the maximum displacement point is located widthwise outside of the third base point.

10. The wheel assembly according to claim 7, wherein the interference at the first base point is 0.7-1.0 times as much as the interference at the second base point.

11. The wheel assembly according to claim 7, wherein the contact pressure between the bead portion and the rim at the first base point is 0.6-0.8 times as much as that at the second base point and the contact pressure between the bead portion and the rim at the third base point is 0.8-1.0 times as much as that at the second base point in the sat where the tire is mounted on the standard rim.

12. The wheel assembly according to claim 7, wherein the area defined by a line extending widthwise outwardly from the outer end point of the bottom of the bead core, a line extending radially inwardly from the outer end point of the bottom of the bead core, and the outer profile line of the tire is 0.93-0.97 times as much as the area defined by the above-mentioned two lines and the outer profile line of the rim.

* * * * *